Nov. 18, 1930.   C. S. BRAGG ET AL   1,781,868
HYDRAULICALLY ACTUATED BRAKE MECHANISM
Original Filed June 26, 1924    4 Sheets-Sheet 1
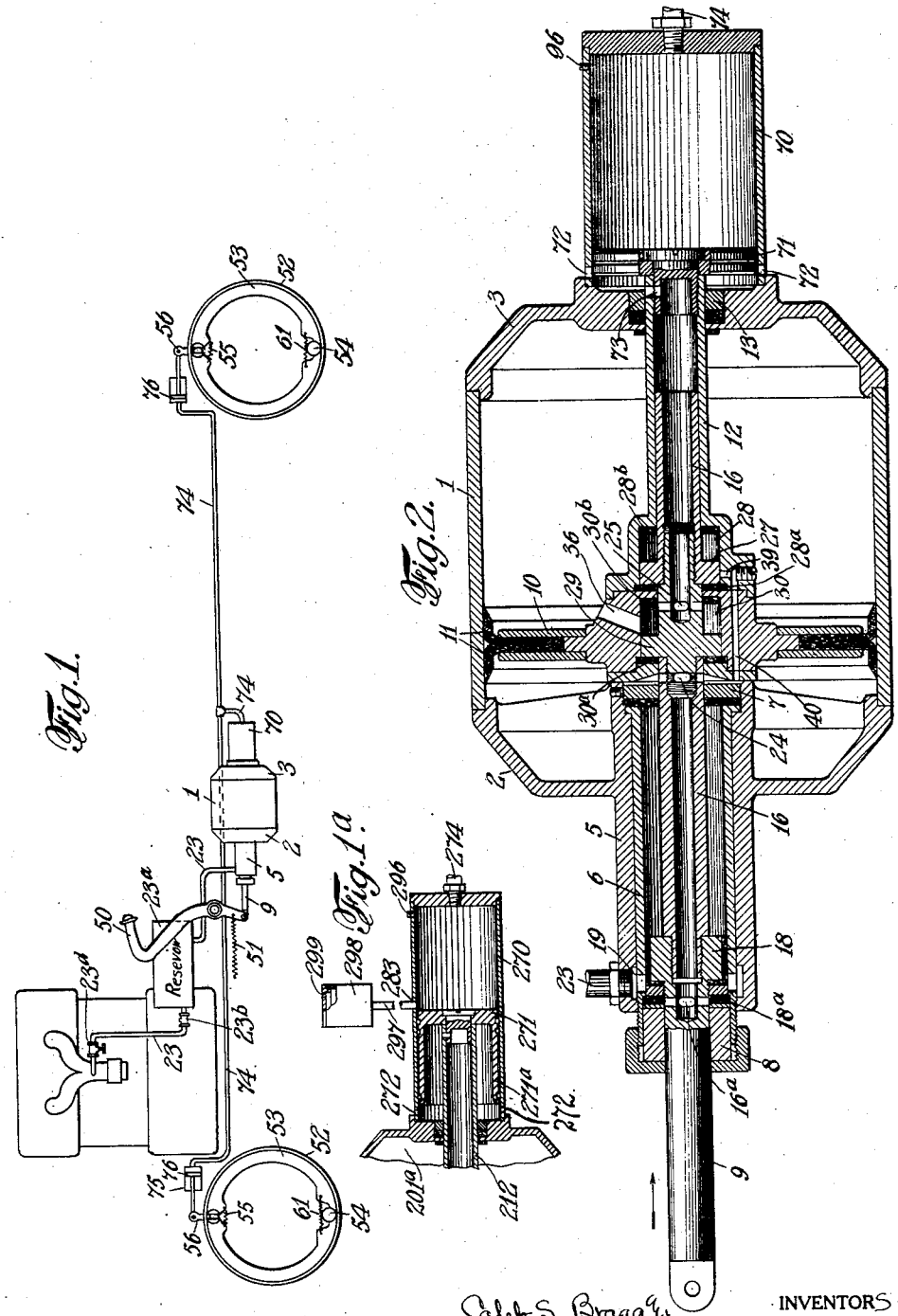
INVENTORS
Caleb S. Bragg
Victor W. Kliesrath
BY
Louis Pruvost
ATTORNEY Nov. 18, 1930.   C. S. BRAGG ET AL   1,781,868
HYDRAULICALLY ACTUATED BRAKE MECHANISM
Original Filed June 26, 1924   4 Sheets-Sheet 2
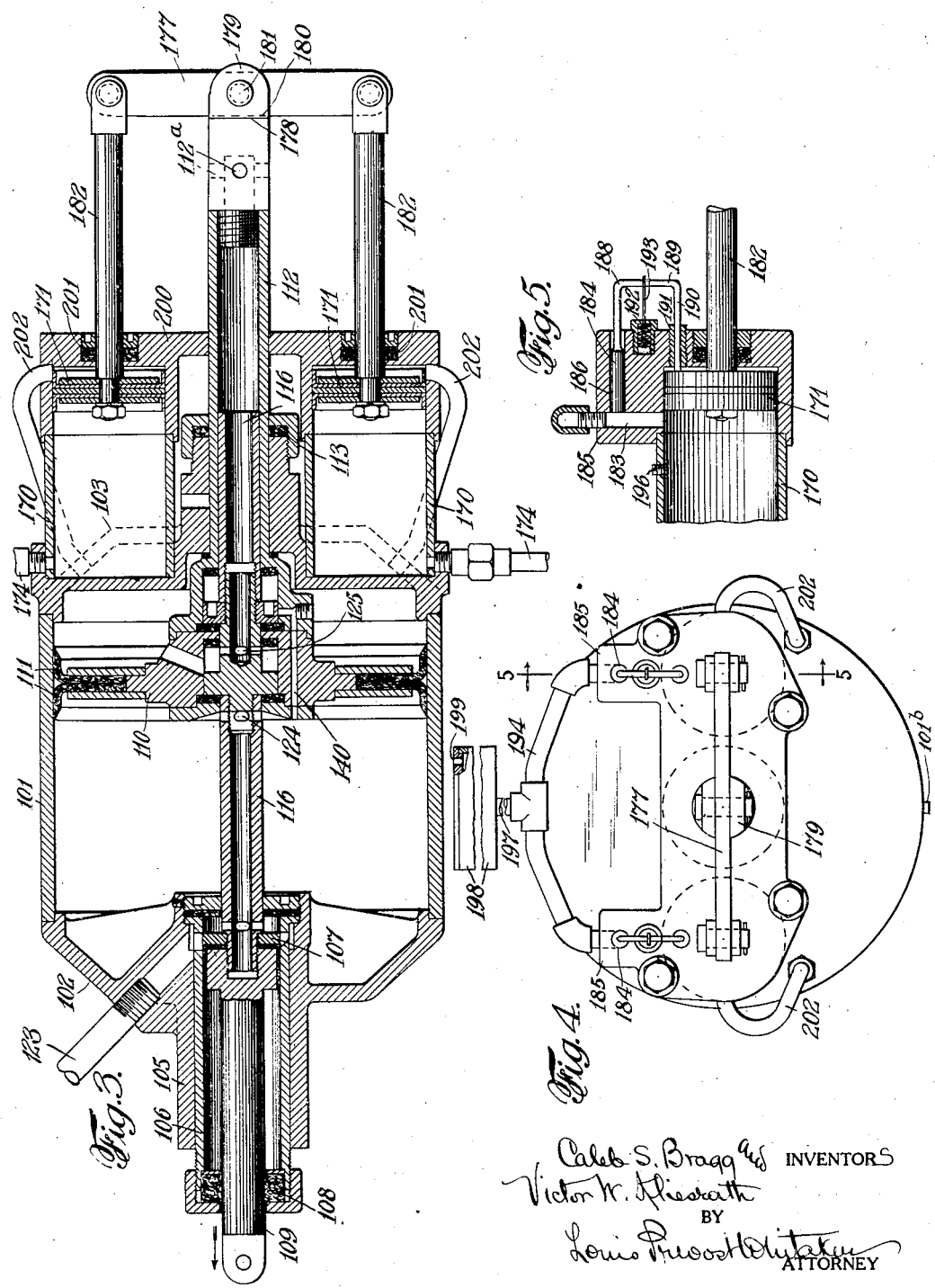

Nov. 18, 1930.  C. S. BRAGG ET AL  1,781,868
HYDRAULICALLY ACTUATED BRAKE MECHANISM
Original Filed June 26, 1924  4 Sheets-Sheet 3
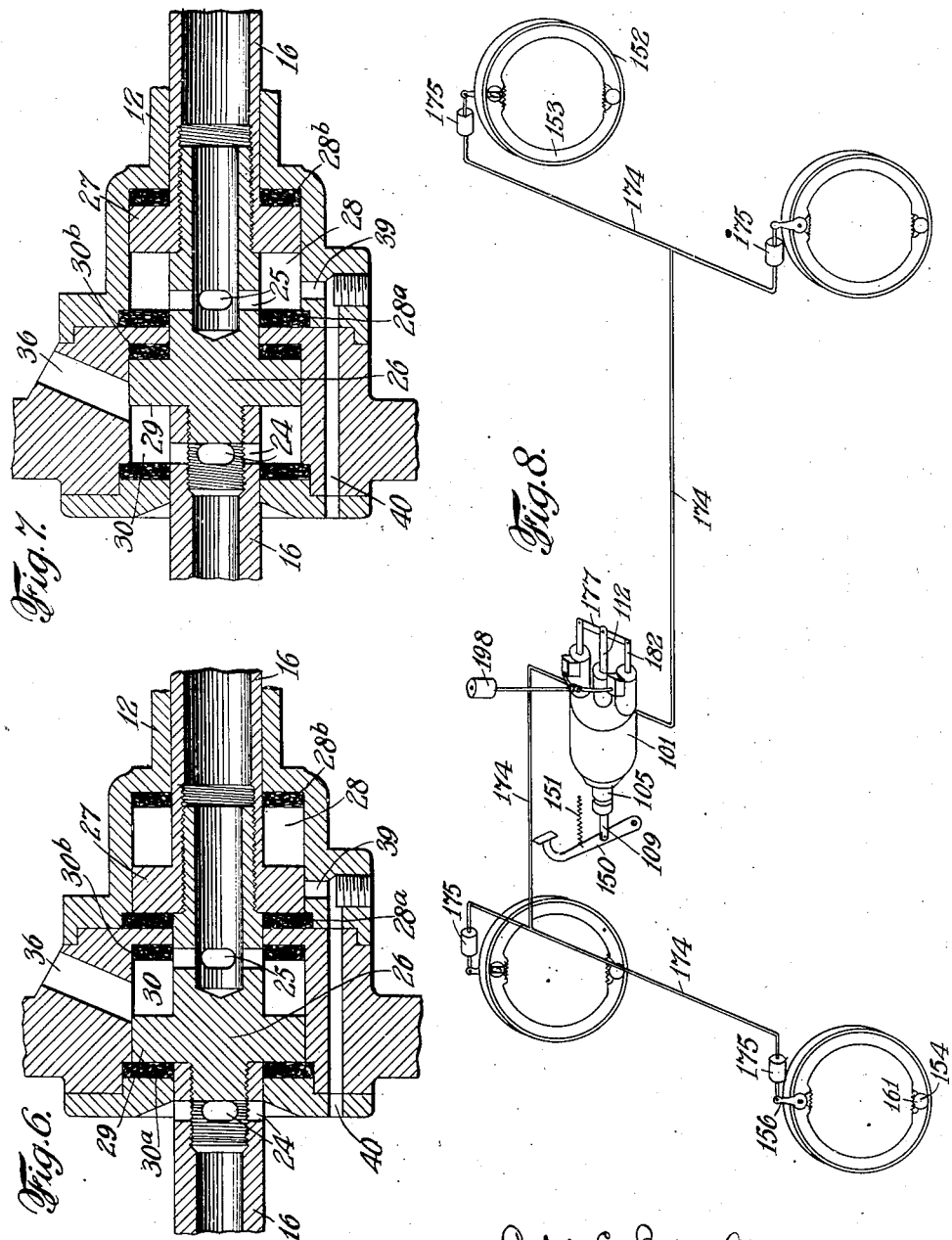

Nov. 18, 1930.  C. S. BRAGG ET AL  1,781,868
HYDRAULICALLY ACTUATED BRAKE MECHANISM
Original Filed June 26, 1924  4 Sheets-Sheet 4
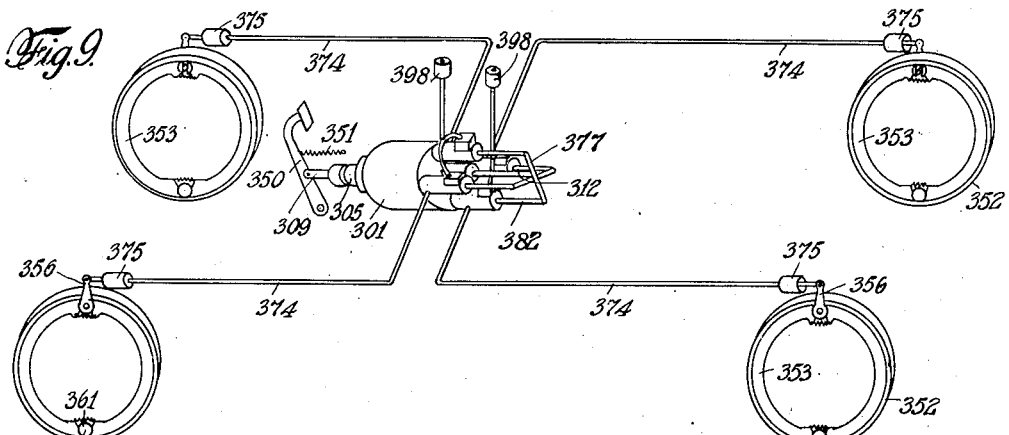
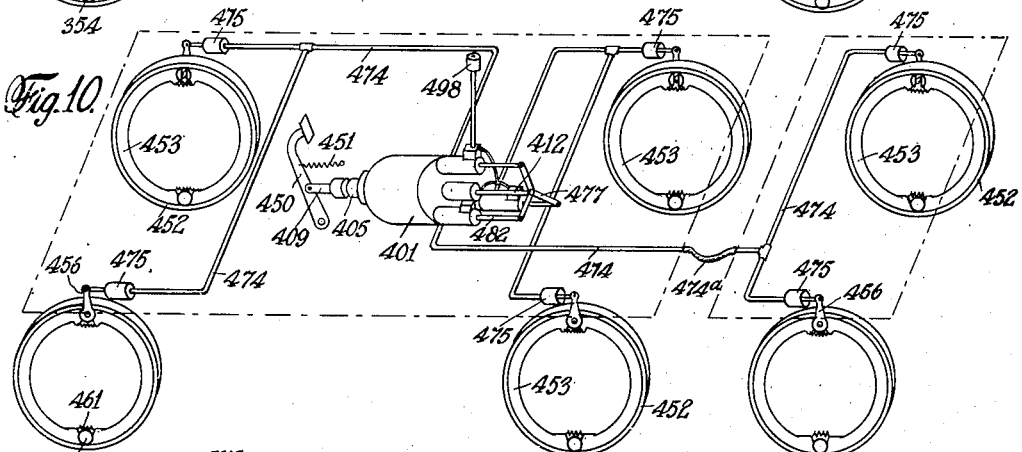
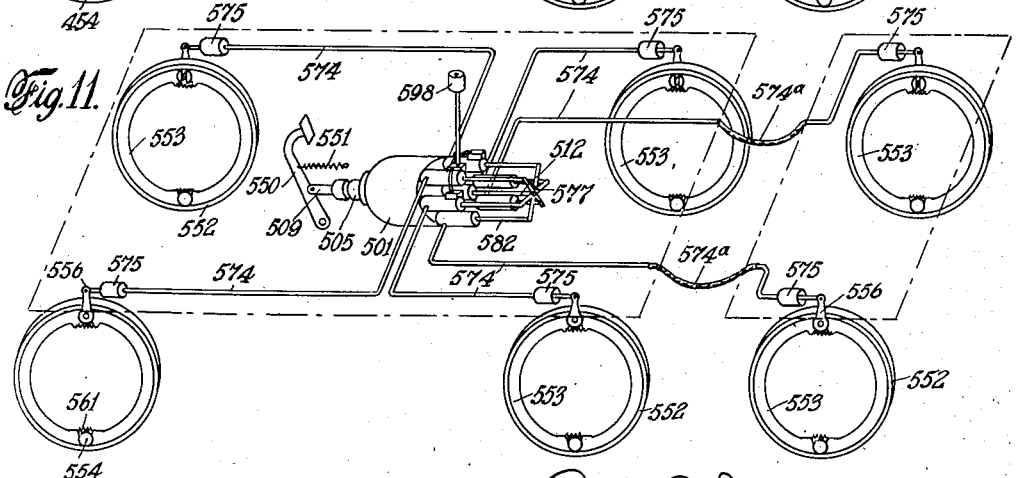

Patented Nov. 18, 1930

1,781,868

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

HYDRAULICALLY-ACTUATED BRAKE MECHANISM

Application filed June 26, 1924, Serial No. 722,485. Renewed October 13, 1928.

Our invention consists in the novel features hereinafter described, reference being had to the accompanying drawings which illustrate two forms in which we have contemplated embodying the invention and which have been selected by us for purposes of illustration, and the said invention is fully disclosed in the following description and claims.

Our invention consists of an improved fluid pressure brake system which, while not limited thereto, is particularly advantageous in its application to automobiles and other self propelled vehicles operated by internal combustion engines and particularly to the equipment of such vehicles with brake mechanism which is simultaneously applied to all four wheels. It is to be understood, however, that our improved invention is applicable to fluid pressure brake systems for the application of a plurality of brake mechanisms which may be located on one vehicle or on a plurality of vehicles connected together, as in the case of an automobile or truck and trailer or trailers, as will hereinafter more fully appear.

In the operation of fluid pressure brakes, and specifically in the case of four wheel brake mechanisms for automobiles, a pressure cylinder and piston is connected by suitable piping with individual actuating cylinders and pistons, located adjacent to each of the wheels, the cylinders and connecting pipes being filled with a liquid, usually oil, the pressure piston being actuated by means of a foot lever to force the liquid into the actuating cylinders of the individual brakes to effect the operation thereof, the pressure piston being returned to normal position by a spring, and springs being also employed usually in connection with each individual brake to relieve the same. In the practical use of such brake mechanism it is found that a considerable amount of pressure must be exerted by the foot of the operator on the brake lever in order to apply the individual brakes equally or set them with great pressure, and it is also found that when the foot lever in relieved of pressure, there is a lag in the return movement of the pressure piston and the individual brake applying or actuating pistons, due to the fact that the movement of the oil or other liquid from the actuating cylinders is resisted frictionally by the walls of the small connecting pipes and the retracting springs employed do not exert sufficient power to instantly retract the liquid from the brake actuating cylinders. It will also be understood that this difficulty cannot be overcome by increasing the power of the retracting spring or springs for the obvious reason that any increase in the power of the retracting spring means an added load opposing the forward movement of the brake lever and this would cause undue strain and fatigue in the use of such brake mechanism. It is therefore necessary to employ a comparatively light retracting spring with the result that there is and must be a certain lag in relieving the brakes, and even this light spring adds considerably to the physical fatigue experienced in using these brakes.

According to our invention, we provide means for operating the pressure piston positively in both directions by power actuated means under the control of a foot lever, or other manually controlled device, thereby relieving the operator first from the fatigue and physical exertion of applying the brakes, and also supplying sufficient power to instantly retract the pressure piston and brake actuating pistons so as to effect an instantaneous release of the brakes. The power actuating mechanism is so connected with the pressure piston, or pistons, that in the event of any failure of the power actuating mechanism to function the continued pressure on the foot lever, or other manually operated control mechanism, will enable the operator to directly actuate by his own strength the pressure piston, and thus apply the brakes, so that there is no danger of accident through any possible failure of the power actuating means. The particular power actuating mechanism which we prefer to employ is constructed, as set forth in our prior application for Letters Patent of the United States, filed December 22, 1923, Serial No. 682,346, in which the special power actuator, per se, is specifically claimed. As therein set forth, it consists preferably of a power cylinder and a double acting piston therein, movable in both directions by establishing differential pressures on opposite faces of the piston, under the control of valve mechanism by which the higher and lower pressures may be reversed with respect to the piston, and by which the cylinders can be cut off from the source of both the higher and the lower pressures, to hold the piston in any desired arrested, or interjacent position. In practice, the apparatus can be operated in connection with any desired means for establishing differential pressure. This power actuator is exceptionally well adapted for use in connection with internal combustion engines which at all times during their operation, present differential pressures. There is a suction produced by the cylinders in drawing in the charges of explosive mixture which is at its maximum when the engine is throttled down and decreases as the throttle is opened. There is also high compression in the cylinders which is greatest when the throttle is wide open, and decreases as the throttle is closed. Our power actuator can therefore be readily operated by the suction from the intake manifold or by compressed gas, or both, as preferred.

In the preferred form of our present invention, our improved actuator is combined with a plurality of pressure cylinders and pistons, each of which controls a brake or a plurality of brakes so that in case of a break in the pipe line supplying oil or other liquid therefor to any one of the brake actuating cylinders, the remaining brakes would nevertheless be applied as usual. It will be understood that where only one pressure cylinder is employed, the effect of a break in any one of the lines of piping communicating with the individual brake actuating mechanisms is to produce a loss of pressure in the pressure cylinder which prevents the operation of any of the brakes. In our preferred form, however, we go further and provide not only a plurality of pressure cylinders, but connect each of our pressure cylinders with a pair of brake actuating cylinders for the wheels on opposite sides at the same end of the chassis. For example, in a four wheel vehicle we may provide two pressure cylinders, one of which is connected with the brake actuating cylinders for the front wheels, and the other with the brake actuating cylinders for the rear wheels, so that in case of accident to either set of cylinders and their connections, the remaining brakes in operative condition will be applied to opposite wheels at the same end of the chassis, thus effecting a balanced braking action on the vehicle and preventing skidding which might otherwise result if the applied brakes were not so arranged. Our invention also contemplates means for equalizing the pressures between the several pressure cylinders for venting the system and for automatically maintaining the required amount of oil or other liquid in the system to compensate for leakage and for the expansion and contraction of the liquid due to changes in temperature. Our invention also in its preferred form contemplates the connection of the pressure cylinders on the side of the piston opposite that engaged by the pressure liquid, with the corresponding end of the power actuating cylinder so that the variations in pressure in the actuating cylinder will be communicated to the pressure cylinders to assist in effecting the desired movements of the pressure pistons in the latter. It is also to be noted that in carrying out our invention, the power actuator and pressure cylinder, or cylinders, can be readily located at any convenient point on the chassis, as the power cylinder, or cylinders, is, or are, connected with the brake actuating cylinders by piping which may be arranged to accommodate any desired location of the pressure cylinders. We find it very desirable to locate the actuating mechanism and pressure cylinder under the hood adjacent to the internal combustion engine, as this keeps the mechanism dry and also warm, and facilitates the operation of the brake mechanism, regardless of changes of temperature. It is also to be understood that the pressure cylinder or cylinders may be connected to any desired number of brakes on a single car, and may also by means of suitable flexible connections, be connected to and caused to operate brake mechanisms of a trailing vehicle, or vehicles, without adding to the physical exertion of the operator, by constructing the power actuating mechanism of the desired capacity.

Referring to the accompanying drawing, in which we have shown two forms or embodiments of our invention, selected by us for purposes of illustration, Fig. 1 represents a diagrammatic view showing our improved actuator in connection with an internal combustion engine of an automobile and in operative relation with a pressure cylinder and a fluid operated brake mechanism.

Fig. 1ª is a detail view showing the pressure cylinder provided with automatic filling and venting means.

Fig. 2 represents a sectional view of a power actuator operatively combined with a pressure piston for actuating a plurality of brakes such as the four wheel brakes of an ordinary automobile.

Fig. 3 represents a horizontal section showing a modification of the invention in which the power actuator is combined with a plurality of pressure cylinders.

Fig. 4 is an end view of the apparatus shown in Fig. 3.

Fig. 5 is a section on line 5—5 of Fig. 4.

Fig. 6 is an enlarged sectional view of the reversing valve mechanism for the actuator.

Fig. 7 is a similar view showing the parts in reversed position.

Fig. 8 is a more or less diagrammatic view showing the connections from the power cylinders illustrated in Fig. 3, to the four wheel brakes.

Fig. 9 is a diagrammatic view illustrating an installation embodying our invention, in which a plurality of power cylinders are shown, each of which is connected to one of the brake mechanisms of the vehicle, four of such power cylinders being illustrated in the drawing.

Fig. 10 is a similar diagrammatic view illustrating an arrangement in which there are three power cylinders, each connected to and operating two brake mechanisms on diametrically opposite wheels of the vehicle, and similarly disposed wheels of a trailer.

Fig. 11 is a similar diagrammatic view illustrating an arrangement in which there are six power cylinders, each connected to the brake mechanism of one of the wheels of the main vehicle and trailer.

Referring to Figs. 1, 2, 6, 7 of the drawing, 1, represents the power cylinder of our power actuator, which is constructed substantially as shown and described in our previous application above referred to, except that in this figure we have shown the piston having its normally balanced position at the forward end of the cylinder. The cylinder, 1, is provided with front and rear heads, 2 and 3, respectively, secured to the cylinder in any desired manner. The forward head, 2, is provided with a guiding sleeve, 5, enclosing a bushing, 6, held in position by an annular guiding ring, 7, at the inner end of the sleeve, the outer end of the sleeve being provided with a stuffing box, indicated at 8, through which extends a longitudinally movable valve actuating rod, 9. Within the cylinder, 1, is a double acting piston, indicated at 10, and provided preferably with annular gaskets, 11, 11, extending in opposite directions, and engaging the inner surfaces of the cylinder wall. The piston, 10, is provided with a tubular extension, 12, which extends through a stuffing box, 13, in the rear cylinder head, 3. 16 represents a longitudinally movable valve sleeve fitting the internal bore of the extension, 12, extending through the cylinder and having its forward end connected with the valve actuating rod, 9. The sleeve, 16, is also provided with a valve collar, 18, on the exterior of the sleeve having its exterior surface ground to fit the interior of the bushing, 6, and adapted to close a port, indicated at 19, in the bushing, communicating with a passage, 23, leading to the source of lower pressure, as for example, the intake manifold of an internal combustion engine. An annular valve seat, 18ª, is provided at the outer end of the sleeve, 16, and adjacent to the port, 19, which is engaged by the outer face of the collar, 18, to further insure a tight joint. The port, 19, may be directly connected to the intake manifold of an internal combustion engine, but we prefer to interpose a vacuum tank, 23ª, in the pipe line, 23, extending to the intake manifold, as indicated in Fig. 1, and to connect the tank by the pipe 23, of considerable diameter to the port, 19, of the power actuator in order that a partial vacuum may be maintained at all times in the tank so as to insure quick response of the actuator as soon as the valve mechanism has placed the cylinder in communication with the tank. As the operation of the brake mechanism and consequent suction through the pipes, 23, will have the effect of varying the percentage of air, in the explosive mixture, we prefer to provide the pipe, 23, with a regulating valve, 23ᵈ, which can be so adjusted while the engine is running idle and fully throttled, and the power actuator is being operated, so as to provide the necessary suction without danger of stalling the engine. The valve sleeve, 16, fits snugly in the central aperture of the guiding ring, 7, and is provided in rear of the valve collar, 18, with a series of ports, 16ª. When the parts are in normal position, as shown in Fig., 2, the port, 19, will be closed by the collar, 18, the port, 16ª, will be closed by passing inside of the packing ring or valve seat, 18ª, and the transverse face of the collar, 18, will be in contact with the packing ring, or valve seat, 18ª. The valve sleeve, 16, is provided with two annular series of openings, indicated at 24—25, respectively, located in different transverse planes lengthwise of the sleeve, and the interior of the sleeve is provided with a partition or plug, 26, between these two series of openings, which may be referred to as the higher and lower pressure openings respectively, 24, being the lower pressure openings, and 25, being the higher pressure openings of the valve mechanism. The sleeve, 16, is also provided on its exterior with a valve or collar, 27, rigidly secured thereto in rear of the high pressure openings, 25, the said collar having its peripheral surface ground to fit a chamber, 28, in the interior of the piston, 10. The sleeve, 16, is also provided with a similar valve or collar, 29, between the two series of apertures, 24 and 25, having its exterior surface ground to fit a chamber, 30, within the piston chamber. The chamber, 30, is provided at its opposite ends with packing washers, 30ª and 30ᵇ, against which the collar, 29, strikes at the extremes of its movement, and the chamber, 28, is provided at opposite ends with similar packing washers, 28ª and 28ᵇ, against which the collar, 27, may strike at the opposite ends of its movement. By reference to Fig. 2, it will be noted that when the sleeve, 16, is pushed rearwardly or to the right, the low pressure apertures, 24, will be in communication with the chamber, 30, which communicates by passage, 36, with the interior of the cylinder in rear of the piston, while the apertures, 25, will communicate with the chamber, 28, which communicates by means of a lateral passage, 39, and longitudinal passage, 40, with the portion of the cylinder, 1, forward of the piston. It will also be seen that when the sleeve is shifted forwardly, or to the left in Fig. 2, the ports, 24, will be drawn forward of the piston so as to communicate with that portion of the cylinder forward of the piston, while the ports, 25, will be brought into communication with the chamber, 30, and placed in communication with that portion of the cylinder in rear of the piston. In other words, the shifting of the sleeve, 16, longitudinally, reverses the connections between the high and low pressure apertures, and the respective portions of the cylinder on opposite sides of the piston, and will naturally effect a reversal of the movement of the piston. In the present instance it will be understood that the low pressure is created by suction from the intake manifold, and the high pressure is furnished by the admission of atmospheric air, which enters longitudinally through the sleeve, 16, through ports, 72, and vent holes, 73, in the manner hereinafter described, and is distributed through the high pressure apertures, 25, to the interior of the cylinder on one or the other side of the piston, according to the position of the valve mechanism. It will also be understood that the valve mechanism can be shifted with respect to the piston in two ways, that is to say, by the movement of the valve sleeve, 16, with respect to the piston, and by the movement of the piston with respect to the valve sleeve. If, therefore, the sleeve, 16, is shifted so as to produce a movement of the piston in one direction or the other, as the case may be, the piston will be immediately moved by reason of the unequal pressures on its opposite faces established by the movement of the valve mechanism, and the movement of the piston will continue until it has moved far enough with respect to the valve mechanism and the sleeve, 16, to establish the balanced position of the piston. The piston can, therefore, be caused to move more or less and in either direction, by slight movements of the valve mechanism, and sleeve, 16, and in any position to which the valve mechanism is moved the piston will instantly respond and come to rest in a balanced condition. In other words, there is a certain amount of lost motion between the valve sleeve and valves and the piston, which in this instance amounts to substantially 7/16 of an inch, although we do not wish to be limited to this particular distance. In any event, it is the distance which the valve sleeve must be moved from its normal position before bringing the valves or collars, 29—27 into contact with the valve seats, $30^b$ and $28^b$, respectively. When the parts are in normal position, the collars, 29 and 27, are drawn forward by the retracting spring, 51, of the foot lever, 50, or equivalent operator operated device, and communication with the passage, 23, leading to the intake manifold is entirely closed by means of the collar, 18, and also by the auxiliary washer, $18^a$. By slightly depressing the foot lever, 50, the parts will be moved into the position indicated in Fig. 7, in which the rod, 9, and sleeve, 16, has been shifted rearwardly the extent of its lost movement. This opens the intake port, 19, and establishes access through the apertures, $16^a$, with the interior of the sleeve, 16. The ports, 24, have also been brought into communication with the chamber, 30, which communicates by the passage, 36, with the cylinder, 1, in rear of the piston, and simultaneously the ports, 25, have been brought into communication with the cylinder, 1, through chamber, 28, and passages, 39—40, forward of the piston for admitting atmospheric air thereto from ports, 73, and vent holes, 72. We have therefore, atmospheric air acting on the forward side of the piston, and the suction of the intake acting on the rear side of the piston, so that the piston will immediately move rearwards, at the same time shifting its relation with the valve mechanism, which remains stationary, and effecting the closing of the ports, 24 and 25, which instantly halts the movement of the piston in a balanced condition, and the piston will remain in this position so long as the foot lever is not moved. Any further forward movement of the foot lever will produce a further rearward movement of the piston, directly corresponding to the extent of movement of the foot lever. If pressure on the foot lever is released, its spring, 51, will draw the sleeve, 16, forwardly, thus moving the port, 24, outside of the piston, and in communication with the cylinder forward of the piston, while the ports, 25, will be brought into communication with the chamber, 30, and admit atmospheric air to the cylinder in rear of the piston, and this adjustment of the valves will be instantly followed by a return movement of the piston until the ports, 24, 25, are again closed. In this manner the piston may be brought either slowly or rapidly toward or to the original or normal position, and may be checked at any point in its return movement, by simply stopping the return movement of the foot lever, and the sleeve, 16. The actuator will, therefore, act under power in either direction, and under the most delicate control of the foot lever, to which it is instantly responsive, through the reversing valve mechanism before described. It is also to be understood that in case the suction should fail for any reason, as a break in the pipe line, or otherwise, the piston can be positively moved forward by the foot lever as soon as the lost motion between the valve mechanism and the piston is taken up, and in like manner, the piston will be positively returned by the retracting spring, 51, in case of failure of the suction by the engagement between the collars, 27 and 29, and the collars, 30ª and 28ª, as soon as the lost motion between the valve mechanism and the piston is taken up. This insures the positive action of the piston in both directions at all times, even though the power mechanism itself should fail.

Referring to the construction shown in Fig. 2, 70, represents a pressure cylinder, which is in this instance mounted on the end of the cylinder, 1, to which it is secured by bolts, or in any other desired manner, coaxial with respect to the piston, 10, and piston rod, 12. Within the cylinder, 70, is a pressure piston, 71, which is secured in any desired manner to the piston rod, 12, connected with the power actuated piston, 10, and the piston rod, 12, extending through the stuffing box, 13, in the end of the power cylinder, as previously described. The pressure cylinder, 70, is filled with oil or other suitable liquid for use in applying the brakes controlled by the power actuator, and the cylinder, 70, is also provided at its inner end, with an air inlet port or ports, 72, which communicate by means of a port, 73, extending through the piston rod, 12, with the interior of the sleeve, 16, and the ports, 25, so as to admit air at all times to the ports, 25, and also to admit air to the cylinder, 70, forward of the piston, 71, when the latter is actuated. These openings, 72, will also serve to facilitate the draining off of any oil which may leak past the piston, 71. The cylinder, 70, is connected by a pipe or pipes, 74, with one or more brake applying cylinders, 75, each of which is provided with a piston, 76, which is connected to any suitable form of brake mechanism. In this instance we have shown the apparatus adapted for the operation of four wheel brakes applied to the four wheels of an automobile or other motor operated vehicle, and each of the pistons, 76, is connected to an arm, 56, for rotating the cam, 55, so as to apply the brake shoes, 53, to the brake band, 52, the said shoes being pivoted in this instance, as at 54, and provided with the usual retracting spring, 61. Obviously we do not desire to be limted to any particular form of brake mechanism, as our present invention is capable of the widest application and may be employed with any type of brakes operated by pressure liquid.

It will be seen that the forward movement of the foot lever, 50, will be followed by the instantaneous rearward movement of the piston, 10, of the power actuator, under power, and this power will be directly applied to the piston, 71, of the pressure cylinder, thus instantly applying all of the brakes simultaneously. As soon as the foot lever is released or relieved, as before described, the piston, 10, will be moved by power in the opposite direction, thus retracting the piston, 71, positively and withdrawing instantly the pressure applied to the brake mechanisms, by drawing back the pressure liquid into the cylinder, 70, and relieving the individual brake pistons from pressure without the lag which would follow necessarily if the return of the individual brake piston, 76, was dependent upon the retracting spring, 61, of the brake shoes. Our improved construction, therefore, provides a mechanism for applying one or a plurality of brakes by fluid pressure in which the power actually required for moving the pressure liquid is furnished by the power actuator, independent of the physical exertion of the operator, although under the most minute and delicate control by the operator, and in which the pressure fluid will be instantly withdrawn by power from the brake cylinders and returned to the pressure cylinders upon the release of the foot lever, while at the same time the device is rendered operative under all conditions including even a failure of power in the power actuator by reason of the fact that the piston, 10, of the power actuator under such circumstances, as well as the pressure piston, 71, will be positively actuated to apply the brake by the physical exertion of the operator applied to the foot lever as soon as the lost motion between the valve mechanism and the piston of the actuator is taken up, and in like manner the brakes will be relieved under such circumstances by the positive return of the actuator piston, and pressure piston, by the retracting spring of the foot lever, assisted by the retracting springs of the individual brake mechanisms.

It will also be noted that our improved mechanism presents another very important feature. The operation of the foot lever, in so far as its operation by the operator is concerned, is exactly the same and in the same directions as in ordinary constructions where the brakes are applied directly by pressure of the operator's foot, except that the operator is relieved entirely from the physical exertion required by such operation. The operator, therefore, does not have to learn anything new in correctly operating our improved mechanism and the mechanism is as delicately responsive to the foot lever or other controlling means as any ordinary brake mechanism, so that the operator can at all times readily determine the exact extent to which the brakes should be applied or relieved to accomplish the results desired.

In Figs. 3 and 4 we have shown a modification of our invention in which the power actuator is combined with a plurality of pressure cylinders, each of which is connected to one or more brake actuating cylinders for operating all of the latter simultaneously, as herein shown, and we have provided two pressure cylinders conveniently mounted upon one end of the cylinder of the power actuator, each of said cylinders being operatively connected to the brake mechanism for two opposite wheels at the same end of the chassis. In these figures the power actuator is constructed subsantially as hereinafter described, and the parts have been given the same reference characters, with 100 added. The only difference between the power actuator as illustrated in Fig. 3 from that shown in Fig. 2, is that the normal position of the power actuator piston is at the opposite end of the cylinder, 1, from that shown in Fig. 2, and the valve actuating stem, 109, and valve sleeve, 116, are moved in the opposite direction, to the left in Fig. 3, to apply the brakes. The rear head of the cylinder, 101, is provided with a stuffing box, 113, through which the hollow piston rod, 112, extends. In this instance the exterior portion of the piston rod is provided with air inlets indicated at 112$^a$, communicating with the interior of the piston rod, the sleeve, 116, and the ports, 125, of the reversing valve mechanism. At the outer end of the piston rod, 112, we provide a centrally pivoted cross bar or equalizer, 177, pivoted between ears, 179, carried by the piston rod, there being a slight clearance, indicated at 178, amounting to subtantially 20/1000 of an inch between the inner edge of the cross bar and the bottom of the recess, indicated at 180 between said ears, which provides a shouldered portion limiting the oscillation of the cross bar or equalizer bar on the connecting pin, 181. Each end of the cross bar, 177, is pivotally connected to a piston rod, 182, secured to a piston, 171, in a pressure cylinder, 170, bolted or otherwise secured to the head of the power actuator cylinder, 101. In this instance the two cylinders are arranged at equal distances from and on opposite sides of the axis of the cylinder, 101, and are filled with oil or other suitable pressure liquid for actuating the cylinders and pistons of the respective brake mechanisms. In this construction we prefer to provide means for equalizing the pressure in the several pressure cylinders, and means for venting the pressure cylinders when the system is originally filled with oil and also for automatically venting the pressure cylinders and for automatically supplying additional oil as may be required to keep the brake system filled and compensate for any loss by leakage past the pistons, or otherwise, within the brake system and to compensate for the expansion and contracting of the liquid due to variations of temperature. In the drawings we have shown one form of apparatus for accomplishing this result. The pressure cylinders being located in a substantially horizontal position any air within the cylinders will naturally collect at the upper sides of the cylinders above the oil level and in practice it is desirable to have the cylinders inclined slightly upward toward their outer ends so as to have any occluded air collected adjacent to the rear ends of the cylinders forward of the pressure pistons therein. At this point just forward of the pistons, each cylinder is provided with a small port, 183, which is a combined oil inlet and vent port located on the upper side of the cylinder and just forward of the piston when the latter is in its retracted position. This port is adapted to be opened and closed by means of a suitable valve, 184, which is moved into open position when the piston reaches its retracted position. In this instance we have shown the slide valve mounted in a boss, 185, (see Figs. 4 and 5) which may be formed on the cylinder or the cylinder head and located in a passage, 186, through which the valve stem, 188, passes. The valve stem is connected by a bar, 189, with a plunger, 190, extending through a stuffing box, 191, into the interior of the cylinder through the head thereof, into such position that it will be struck by the piston as it comes into retracted position thus opening the slide valve, 184. When the piston moves forward, the plunger, 190, is released and the slide valve is returned to closed position by means of a spring, 192, in this instance acting upon a plunger, 193, connected with the bar, 189. The ports, 183, of the pressure cylinders are connected for joint operation by an equalizing pipe, 194. For the purpose of venting the cylinders, while they are being filled with oil, we provide each of the cylinders with a vent opening on its upper side adjacent to the port, 183, normally closed by a removable vent plug, 196, to allow of the escape of air, while the oil is being introduced into the system through pipe, 194. These vent openings are, however, normally closed by the plugs, as shown. The equalizing pipe, 194, is connected by pipe, 197, with an oil reservoir, 198, provided with a closure in which is a vent opening, 199, for normally venting the reservoir in which is normally maintained a supplemental quantity of oil at all times. Assuming that the system is completely filled with oil, and the pistons are in the fully retracted position, and the slide valves, 184, are in open position, the pressures will be equalized between the two cylinders through the equalizing pipe, or passage, 194. If the pistons are moved forward by the actuator, a certain amount of oil will be displaced and returned to the reservoir until the pistons have travelled far enough to close the ports, 183, and at the same time permits the slide valves, 184, to close under the influence of their retracting springs, 192, thereby cutting the cylinders off from communication with the oil reservoir and preventing oil from flowing into the pressure cylinders in rear of the pistons which would otherwise occur. On the return movements of the pistons they strike the plungers, 190, when near their normal positions, and open the slide valves, 184, thereby again placing the cylinders in communication with the oil reservoir. If any oil has been lost by leakage, or otherwise, during the operation of the brakes, there will be a slight partial vacuum formed when the pistons return to their normal positions, and as soon as the slide valves are opened, oil from the reservoir will immediately flow into the cylinders through the equalizing pipe, 194, to supply the deficiency. It will also be obvious that as the vent ports, 183, effect a communication between a vented reservoir of liquid, and the entire system, when the pressure pistons are in retracted positions, they will compensate for the expansion and contraction of the liquid. Thus if the vehicle is run into a warm garage and the liquid becomes heated and expands, the excess due to expansion can escape into the reservoir, and if the vehicle is taken from a warm room into a cold atmosphere so that the liquid contracts, additional liquid will flow into the system to keep it filled. Ample opportunity is afforded for such compensating action between actuations of the brakes which are only used occasionally and for brief period, so that the system is always kept in operative condition. If any air is present in the pressure cylinders, it will naturally collect along the upper portions of the cylinder wall, and if the cylinders remain in normal position for considerable periods of time between successive operations of the brake, this air is automatically vented through the combined inlet and vent ports, 183, working its way upward through the oil into the reservoir, 198, and finally escaping through the vent aperture, 199. However, if there has not been sufficient delay between operations of the brakes to permit the air collected at the top of the cylinders to be automatically vented, the first portion of the movement of the pressure pistons, until the ports, 183, are covered, will positively expel any air collected at the tops of the cylinders into the pipes, 194, 197, leading to the vented oil reservoir. This construction, therefore, provides for equalizing the pressures in the pressure cylinders, and also for automatically venting the cylinders, and for automatically supplying additional quantities of oil, as may be required from time to time, to keep the pressure system full.

In this form of our invention, we prefer to close the outer ends of the pressure cylinders by means of suitable heads, indicated at 200, provided with stuffing boxes, 201, through which the piston rods, 182, pass, and to connect the outer end of each cylinder beyond the piston therein by a pipe, or passage, 202, with the adjacent end of the power actuator cylinder, 101, as shown. It follows from this construction that when the actuator piston moves forward in the direction of the arrow in Fig. 3, at which time there will be a partial vacuum forward of the piston, and atmospheric air is admitted in rear of the piston the atmospheric air will also be admitted by the passages, 202, to the rear ends of the pressure cylinders in rear of the pistons therein, so as to prevent the formation of a vacuum in either of the pressure cylinders in rear of the pistons. On the reverse movement of the actuator piston, during which time the suction is applied to the actuator cylinder in rear of the piston thereof, producing a partial vacuum in that portion of the cylinder, 101, the effect of the passages, 202, will be to simultaneously create a partial vacuum in rear of each of the pressure pistons, 171, within the outer ends of the pressure cylinders, 170, and this assists in the quick return movement of the pressure pistons and in effecting the substantially instantaneous withdrawl of oil from the brake cylinders, and thereby assists in securing the immediate release of the brakes, and will tend to compensate for any reduction of vacuum which might in some cases occur due to the opening of the throttle before or at the time the brakes are released. If there should be any leakage of oil past the pressure cylinders, this oil will be transferred through the passages, 202, to the rear portion of the actuator cylinder, 101, and to prevent an accumulation of this excess oil, the actuator cylinder may be provided with a drain aperture in the bottom, normally closed by a plug, 101$^b$, which may be removed at suitable intervals to drain off any accumulated oil.

There are a number of advantages which result from the provision of a plurality of pressure cylinders, such as we have illustrated in Figs. 3 and 4. We prefer to employ two cylinders in a four wheel brake system and to connect each cylinder with the two brake actuating cylinders of wheels located opposite to each other, and at the same end of the chassis, as the front wheels or the rear wheels, respectively. This is our preferred construction, because if there should be a break in one of the pipe lines leading from one of the pressure cylinders to the brake actuating cylinders of the brake mechanism actuated thereby, the result would be that the contained oil would run out and thus the brake mechanisms would not be operated. Where a single pressure cylinder is employed, obviously a break in the oil line would throw all of the brakes out of operative condition and might lead to a serious accident, but with the two pressure cylinders connected in the manner above described, the breaking of a single pipe line or other oil connection, while it would prevent the operation of the brake mechanisms connected therewith, it would not prevent the operation of the brake mechanisms for the other wheels, thus insuring the exertion of the proper braking power under all conditions. By connecting each oil cylinder with the brake mechanisms of two opposite wheels at the same end of the chassis, the braking power will be applied in such manner that there will be no danger of skidding, which might otherwise result.

It is within the scope of our invention to employ a greater number of pressure cylinders than two, if desired, for example, we may employ four pressure cylinders, one connected with each of the brake actuating cylinders of a four wheel vehicle as illustrated, for example, in Fig. 9, in which corresponding parts to those shown in Fig. 1, are given the same reference characters, with the addition of 300. If the vehicle has six wheels, as is sometimes the case, or where the vehicle has four wheels and draws a trailer having two wheels, for example we may employ three pressure cylinders, each connected to the brake mechanisms of two opposite wheels, as shown in Fig. 10, in which the parts corresponding to those in Fig. 1, are given the same numerals with the addition of 400, or we may employ six pressure cylinders arranged in a circular series, each of which is connected to one brake actuating cylinder as shown in Fig. 11, in which the parts corresponding to those shown in Fig. 1, are given the same numerals with the addition of 500. It will also be understood that where trailing vehicles are employed, the actuator and pressure cylinder or cylinders being connected by suitable piping with the brake mechanism for the main vehicle, and by suitable piping, including flexible pipe connections 474$^a$, Fig. 10, or 574$^a$, Fig. 11, extending in a well known way from one vehicle to another, to the brake actuating mechanism for the trailing vehicle or vehicles, so that all the brakes of the main vehicle and trailing vehicle, or vehicles, are simultaneously applied and released by means of a single actuator located on the main vehicle and controlled by the operator thereof.

While we have shown the actuator in this instance operated by the suction from the intake manifold acting on one side of the piston and atmospheric air acting on the other side, to produce the necessary differential pressure to move the piston in one direction or the other, it is to be understood that the actuator may be operated by differential pressures obtained in other ways, as set forth in our former application for Letters Patent herein referred to. Thus, for example, the actuator piston may be operated by pressure fluid from the engine cylinder acting on one side of the piston, atmospheric air on the other side, or by pressure fluid from the engine cylinder acting on one side of the piston, and suction from the intake manifold, acting upon the other side of the piston. The specific means for effecting the operation of the actuator under these conditions, however, form no part of our present invention, as they are fully disclosed in our former application, and they will, therefore, not be specifically or further described herein.

The form of apparatus illustrated in Figs. 1 and 2, in which a single pressure piston is employed may also be provided with means for automatically supplying oil and venting the pressure cylinder, as indicated in Fig. 1$^a$. In this figure the actuator, indicated at 201$^a$, is constructed as shown in Fig. 2, and provided with a single pressure cylinder, 270, which in this instance is a little more than twice the length of the stroke of the pressure piston, 271, the said piston being provided with an apron, 271$^a$, as shown, and being connected to the piston rod, 212, of the actuator. The end of the cylinder, 270, nearest the actuator is provided with air inlet ports, 272, which also serve as oil drains and the outer end of the cylinder is preferably provided with a vent aperture closed by a plug, 296, which may be removed to facilitate filling the cylinder, and hydraulic mechanism connected therewith with oil. The pressure cylinder, 270, is also provided with a pipe, 274, connecting it with the hydraulic brake actuating mechanism. The cylinder, 270, is also provided on its upper side with a combined venting and filling port, 283, connected by a vertical pipe, 297, with an oil reservoir, 298, provided with a normally open vent aperture, 299. The port, 283, is located in such a position that when the pressure piston is in retracted position, as shown in Fig. 1$^a$, this port will be opened and in communication with the pressure cylinder, 270. Any air in the cylinder collecting at the top thereof adjacent to the port, 283, will be automatically vented through the pipe 297, to the vented oil reservoir, 299, in the manner hereinbefore described. When the pressure piston, 271, is operated by the actuator, the first movement thereof will force any air in the upper part of the cylinder adjacent to the port, 283, out through the pipe, 297, and then also force out any excess oil, until the port, 283, is closed by the piston. The port, 283, will be maintained in closed position during the stroke of the piston by means of the apron, 271$^a$. On the return movement of the piston, if there has been any loss of oil from the system a partial vacuum will be formed and as soon as the system is retracted far enough to open the port, 283, oil will be drawn in from the pipe, 297, and the oil reservoir, so as to maintain the cylinder, 270, and the hydraulic system connected therewith filled at all times.

What we claim and desire to secure by Letters Patent is:—

1. In a hydraulically actuated brake mechanism, the combination with a pressure cylinder and piston, and hydraulically actuated brake applying mechanism connected with said pressure cylinder, of a double acting power actuator operatively connected with the pressure piston, said power actuator including among its members a cylinder and piston, and operator operated parts being connected with the actuator piston by means permitting lost motion, whereby in case of failure of the power the actuator piston and pressure piston will be positively actuated by the operator, to apply the brakes.

2. In a hydraulically actuated brake mechanism, the combination with a pressure cylinder and piston, and hydraulically actuated brake applying mechanism connected with said pressure cylinder, of a double acting power actuator operatively connected with the pressure piston, said power actuator including among its members a cylinder and piston and operator operated parts being connected with the actuator piston by means permitting lost motion, and a retracting spring for the operator operated parts, whereby in case of failure of the power, the actuator piston and pressure piston will be operatively actuated in one direction by the operator to apply the brakes and in the opposite direction by said spring to release the brakes.

3. In a hydraulically actuated brake mechanism, the combination with a pressure cylinder and piston, and hydraulically actuated brake applying mechanism connected with said pressure cylinder, of a double acting power actuator comprising a cylinder and piston connected with the pressure piston, means for establishing varying pressures on opposite faces of the actuator piston including a reversing valve mechanism, constructed to maintain a balanced condition of the piston when in an interjacent position, between its limits of movement, and operator operated means connected with the actuator piston by means permitting lost motion.

4. In a hydraulically actuated brake mechanism, the combination with a plurality of pressure cylinders, a pressure piston in each of said pressure cylinders and hydraulically actuated brake applying mechanism connected to each of said pressure cylinders, of a double acting power actuator comprising a cylinder, an actuator piston therein, and means including a reversing valve mechanism for establishing differential pressures on opposite faces of the actuator piston, said valve mechanism being constructed to maintain a balanced condition of the actuator piston when in an interjacent position between its limits of movement, and an operator operated part for actuating said reversing valve mechanism, connected with the piston by means permitting lost motion, said actuator piston being connected with said pressure pistons for actuating them simultaneously in both directions, whereby the pressure pistons will be actuated by the operator operated part in case of failure of power, and whereby in case of the leakage in the hydraulic system connected with one pressure cylinder, the brake mechanism operatively connected to the other pressure cylinder, or cylinders, will be applied.

5. In a hydraulically actuated brake mechanism, the combination with a plurality of pressure cylinders, a pressure piston in each of said cylinders, a pair of hydraulic brake applying mechanisms arranged in connection with wheels on opposite sides of the vehicle having their axes of rotation coaxial and perpendicular to the direction of travel of the vehicle, connected to each of said pressure cylinders, and means for simultaneously operating said pressure pistons, whereby in case of loss of pressure in the hydraulic system connected with one cylinder, the brakes connected with each pressure cylinder, or pressure cylinders, will be applied to directly opposite wheels of the vehicle equally, a power actuator comprising an actuating cylinder, an actuator piston therein operatively connected with said pressure pistons, means for establishing differential pressures on opposite faces of the actuator piston, reversing valve mechanism for the actuator, an operator operated part for said valve mechanism, and operative connections between the operator operated part and actuator piston for enabling the operator to add his physical force to that of the actuator, and to positively operate the actuator piston and the pressure pistons, and brake mechanism operatively connected therewith in case of failure of power.

6. In a hydraulically actuated brake mechanism, the combination with a plurality of pressure cylinders, a pressure piston in each of said cylinders, hydraulic brake applying mechanism connected with each of said pressure cylinders, means for simultaneously operating said pressure pistons, and means including an equalizing liquid passage for connecting the pressure cylinders and the hydraulic brake mechanisms connected therewith with each other and with the atmosphere, when their pistons are in retracted position.

7. In a hydraulically actuated brake mechanism, the combination with a plurality of pressure cylinders, a pressure piston in each of said cylinders, hydraulic brake applying mechanism connected with each of said pressure cylinders, means for simultaneously operating said pressure pistons, a liquid reservoir communicating with the atmosphere above its liquid level, and means including an equalizing liquid passage for connecting the pressure cylinders with each other and with said reservoir when the pressure pistons are in retracted position.

8. In a hydraulically actuated brake mechanism, the combination with a plurality of pressure cylinders, a pressure piston in each of said cylinders, a pair of hydraulic brake mechanisms for two wheels, disposed directly opposite to each other transversely of the chassis of the vehicle, connected to each of said pressure cylinders, means for simultaneously operating said pressure pistons, and an equalizing liquid passage connecting said pressure cylinders when the pistons therein are in retracted position, whereby equal pressures will be applied to the brake mechanism of all the wheels of the vehicle, and in case of failure of pressure in the hydraulic system connected with any pressure cylinder, the braking action may be effected by the remaining cylinders equally on wheels disposed diametrically opposite to each other, a power actuator comprising a cylinder, a piston therein operatively connected with said pressure pistons, means for establishing differential pressures on opposite faces of the actuator piston, reversing valve mechanism for the actuator, an operator operated part connected with said reversing valve mechanism, and connected with said actuator piston for enabling the operator to add his physical power to that of the actuator and to operate the actuator piston and the pressure pistons connected therewith in case of failure of power.

9. In a hydraulically actuated brake mechanism, the combination with a plurality of pressure cylinders, a pressure piston in each of said cylinders, hydraulic brake mechanism connected with each of said pressure cylinders, means for simultaneously operating said pressure pistons, an equalizing liquid passage connected to each of said pressure cylinders by a port located adjacent to the forward side of the piston therein when the latter is in retracted position, means for closing each of said ports when the pistons move forward, and opening said ports when the pistons are in retracted position, an oil reservoir connected with said equalizing passage by an unrestricted passage, said oil reservoir being open to the atmosphere above the surface of the liquid therein, whereby said pressure cylinders will be vented, maintained in filled condition, and the pressure therein equalized when the pressure pistons are retracted, and whereby when the pistons are moved forward, the cylinders will be disconnected from said equalizing passage.

10. In a hydraulically actuated brake mechanism, the combination with a plurality of pressure cylinders, a pressure piston in each of said cylinders, hydraulic brake mechanism connected with each of said pressure cylinders, means for simultaneously operating said pressure pistons, an equalizing liquid passage connected to each of said pressure cylinders by a port located adjacent to the forward side of the piston therein when the latter is in retracted position, a valve for disconnecting each of said ports from the equalizing passage, means including a part in the path of each piston into retracted position, for moving said valves to open position, means for moving said valves into closed position, an oil reservoir normally open to the atmosphere above the liquid level therein, and an unrestricted passage from the oil reservoir to the equalizing passage, whereby said pressure cylinders will be vented, maintained in filled condition, and the pressure therein equalized when the pressure pistons are retracted, and whereby when the pistons are moved forward the cylinders will be disconnected from said equalizing passage.

11. In a hydraulically actuated brake mechanism, the combination with a pressure cylinder, a pressure piston working therein, hydraulically actuated brake applying mechanism connected with the pressure cylinder, and means for applying pressure to the pressure piston and for retracting the same, said cylinder being provided with a combined oil inlet and venting port forward of the position occupied by the piston when in retracted position, for replacing the oil lost and venting the cylinder, an oil reservoir provided with a vent aperture and connected with said port, a movable valve for controlling said port, a spring normally acting to close said valve, and a movable plunger adapted to be engaged by the piston when in its retracted position and operatively connected with said valve to open the same when the piston is retracted.

12. In a hydraulically actuated brake mechanism, the combination with a plurality of pressure cylinders, a pressure piston in each of said pressure cylinders, hydraulically actuated brake applying mechanisms connected to each of said cylinders, means for simultaneously advancing and retracting said pressure pistons, an equalizing passage connecting said pressure cylinders, an oil reservoir connected to said equalizing passage, for replacing oil lost in operation, a valve interposed between said equalizing passage and each of said cylinders, and means controlled by the pressure pistons for opening said valves when the pistons are in retracted position and effecting the closing of the valves when the pistons are advanced.

13. In a hydraulically actuated brake mechanism, the combination with a plurality of pressure cylinders, a pressure piston in each of said pressure cylinders, hydraulically actuated brake applying mechanisms connected to each of said cylinders, means for simultaneously advancing and retracting said pressure pistons, an equalizing passage connecting said pressure cylinders, an oil reservoir connected to said equalizing passage, for replacing oil lost in operation, a valve interposed between said equalizing passage and each of said cylinders, a spring for each of said valves for normally closing it, and a plunger in the path of each of said pressure pistons when in retracted position, operatively connected with the adjacent valve for opening said valve when the piston is in retracted position.

14. In a hydraulically actuated brake mechanism, the combination with a plurality of pressure cylinders, a pressure piston in each of said pressure cylinders, hydraulically actuated brake applying mechanisms connected to each of said cylinders, means for simultaneously advancing and retracting said pressure pistons, each of said pressure cylinders being provided with a combined oil inlet and venting port forward of the position occupied by the piston when in retracted position, an equalizing passage connecting said ports of said cylinders, an oil reservoir connected to said equalizing passage for replacing oil lost in operation and provided with a vent aperture above the oil level therein, a movable valve for controlling each of said ports, springs for each valve, for moving it into closed position, and a movable part operatively connected with each valve and adapted to be operated by the piston when moved to retracted position, for opening the valve.

15. In a hydraulically actuated brake mechanism, the combination with a plurality of pressure cylinders closed at both ends, a movable pressure piston in each cylinder, and hydraulically actuated brake applying mechanism connected to each of said pressure cylinders forward of the piston therein, a double acting power actuator comprising an actuator cylinder, an actuator piston therein, means for establishing differential pressures on opposite faces of the actuator piston, and a reversing valve mechanism constructed to maintain a balanced condition of the actuator piston when in an interjacent position between its limits of movement, said actuator piston being connected with said pressure pistons for actuating them simultaneously in both directions, connecting passages from one end of the actuator cylinder to each of said pressure cylinders in rear of the pistons therein, and an operator operated mechanism for said reversing valve.

16. In a hydraulically actuated brake mechanism, the combination with a plurality of pressure cylinders closed at both ends, a movable pressure piston in each cylinder, and hydraulically actuated brake applying mechanism connected to each of said pressure cylinders forward of the piston therein, a double acting power actuator comprising an actuator cylinder, an actuator piston therein, means for establishing differential pressures on opposite faces of the actuator piston, and a reversing valve mechanism constructed to maintain a balanced condition of the actuator piston when in an interjacent position between its limits of movement, said actuator piston being connected with said pressure pistons for actuating them simultaneously in both directions, connecting passages from one end of the actuator cylinder to each of said pressure cylinders in rear of the pistons therein, an operator operated mechanism for said reversing valve, and an equalizing passage connecting said pressure cylinders forward of the pistons therein.

17. In a hydraulically actuated brake mechanism, the combination with a plurality of pressure cylinders closed at both ends, a movable pressure piston in each cylinder, and hydraulically actuated brake applying mechanism connected to each of said pressure cylinders forward of the piston therein, a double acting power actuator comprising an actuator cylinder, an actuator piston therein, means for establishing differential pressures on opposite faces of the actuator piston, and a reversing valve mechanism constructed to maintain a balanced condition of the actuator piston when in an interjacent position between its limits of movement, said actuator piston being connected with said pressure pistons for actuating them simultaneously in both directions, connecting passages from one end of the actuator cylinder to each of said pressure cylinders in rear of the pistons therein, an operator operated mechanism for said reversing valve, an equalizing passage connecting said pressure cylinders forward of the pistons therein, an oil reservoir connected with said equalizing passage, and valves for controlling the communication between said equalizing passage and said cylinders normally held in open position when the pressure pistons are in retracted position, and constructed to close when the pressure pistons are advanced by the actuator.

18. In a hydraulically actuated brake mechanism, the combination with a plurality of pressure cylinders, each having a pressure piston therein, a separate hydraulic system connected with each of said pressure cylinders, including an actuating piston, a cylinder, and liquid conducting connections therefrom to the pressure cylinder, each pressure cylinder being at all times in free communication with its connected hydraulic system, and provided with a port on its upper side adapted to be opened by the pressure piston when in retracted position, and to be closed during the power stroke of the pressure piston, an equalizing passage connecting the said ports of said pressure cylinders, and communicating freely in both directions with said cylinders when the pressure pistons are retracted, and a vented reservoir located above said equalizing passage and communicating freely therewith at all times, to keep the several pressure cylinders and their hydraulic systems filled, to vent occluded air from said systems, and to compensate for the expansion and contraction of the liquid in each pressure cylinder, and the hydraulic system connected therewith under variations in temperature.

In testimony whereof we affix our signatures.

CALEB S. BRAGG.
VICTOR W. KLIESRATH.